(No Model.) 2 Sheets—Sheet 1.

C. WARD.
REVERSING GEAR.

No. 510,218. Patented Dec. 5, 1893.

Witnesses: Inventor.

(No Model.) 2 Sheets—Sheet 2.

C. WARD.
REVERSING GEAR.

No. 510,218. Patented Dec. 5, 1893.

UNITED STATES PATENT OFFICE.

CHARLES WARD, OF TORONTO, CANADA.

REVERSING-GEAR.

SPECIFICATION forming part of Letters Patent No. 510,218, dated December 5, 1893.

Application filed June 23, 1893. Serial No. 478,630. (No model.)

*To all whom it may concern:*

Be it known that I, CHARLES WARD, of the city of Toronto, in the county of York, Province of Ontario, Canada, have invented certain new and useful Improvements in Reversing-Gear; and I hereby declare that the following is a full, clear, and exact description of the same.

The object of this invention is to produce a simple arrangement of gearing for instantaneously and easily reversing the direction of rotation of a shaft, and it consists essentially of dividing the shaft into sections, the adjacent ends of which are each fitted with a spline; a bevel gear mounted on each adjacent end; the hub of which is provided with a key seat fitting the spline on the shaft, the hubs of these bevel gears extending to the end of each section of the shaft and fitted thereat with a toothed clutch, a washer a predetermined distance from the rear of each of said bevel gears, a spring located between said washer and bevel gear pressing said bevel gear toward the end of its section of the shaft, each hub being provided with a collar against which bears a lever, a shaft counter to the first one sliding in suitable bearings on the lower end of which is loosely mounted a bevel gear fitted with a wedge, a lever to force downwardly said bevel gear and spring it into engagement with the bevel gears on the shaft, said wedge forcing outwardly at the same time the levers which bear against the collars of the hubs of the bevel gears mounted on the shaft, thus bringing all three bevel gears into engagement and causing one shaft section to rotate in the reverse direction to the other, the whole device being constructed and arranged as hereinafter more fully set forth in the specification and more particularly pointed out in the claims.

Figure 2:
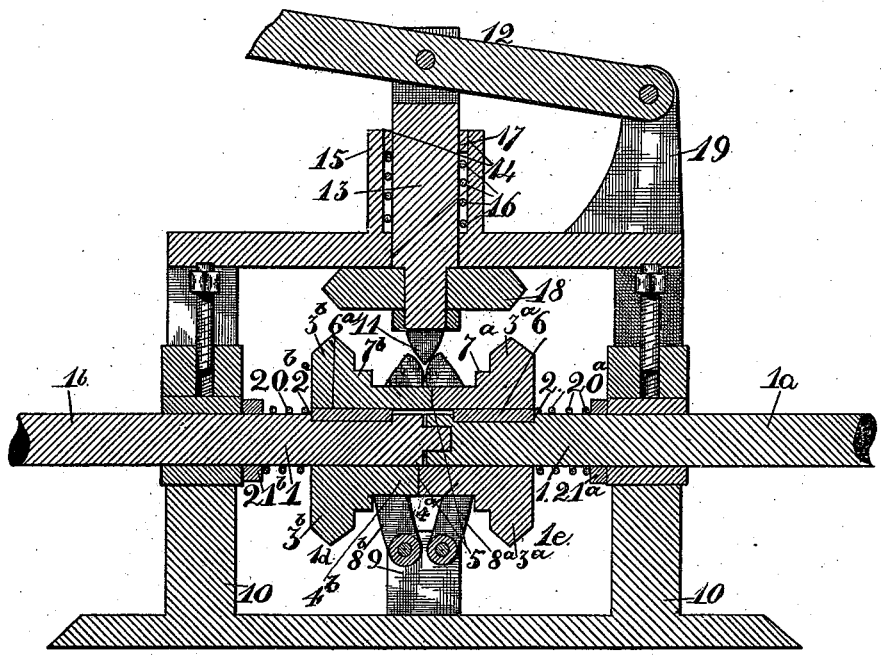
Figure 1:
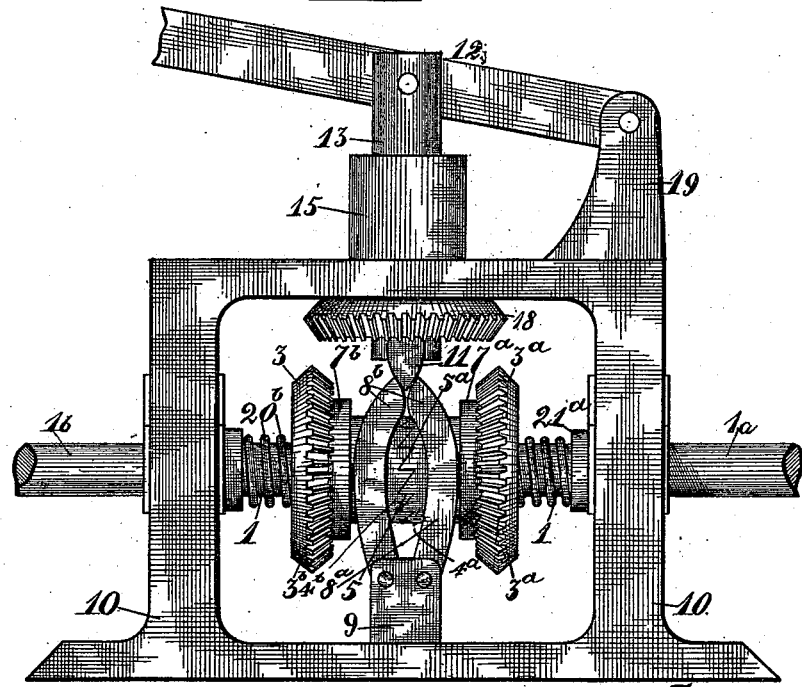
Figure 3:
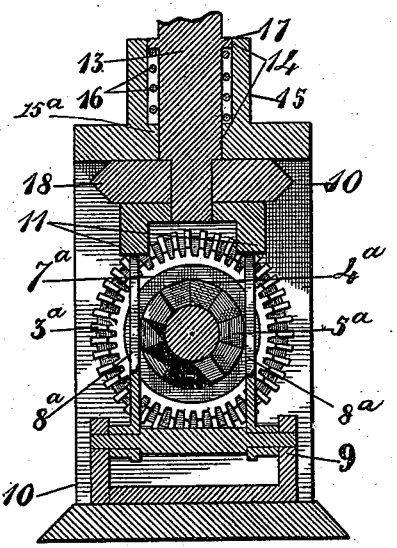
Figure 4:
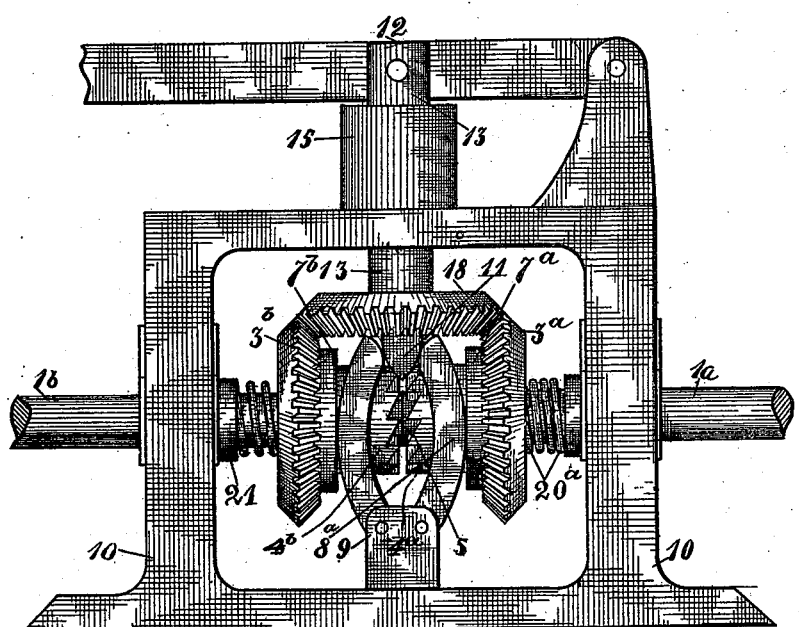

In the drawings, Figure 1 is a side elevation of the reversing gear. Fig. 2 is a sectional view of Fig. 1. Fig. 3 is an end elevation of the device. Fig. 4 is a view showing the reversing bevel gear in mesh with the bevel gear on the shaft.

Like numerals of reference refer to like parts throughout the specification and drawings.

In the drawings, 1, refers to the shaft divided into two or more shaft sections, respectively, $1^a$ and $1^b$. In the end of the shaft section $1^a$ is a recess $1^c$ into which enters a pin $1^d$ projecting from the end of the section $1^b$ for the purpose of providing a means for giving rigidity or steadiness of motion to the ends of the said shaft sections during their rotation in the same direction. Fitted at or near the adjacent end of each of the shaft sections $1^a$ and $1^b$ is a spline 2 of a suitable length and extending longitudinally along the shaft 1. Mounted on the end of the shaft section $1^a$ adjacent to the end of the shaft section $1^b$ is a bevel gear $3^a$ which is provided with a hub $4^a$ extending from its toothed side face to the said adjacent end of the shaft section $1^a$. The hub $4^a$ is toothed to form one member of the clutch 5. Mounted on the end of the section $1^b$ adjacent to the end of the shaft section $1^a$ is a bevel gear $3^b$ similar to the bevel gear $3^a$ and provided with a hub $4^b$ similar to the hub $4^a$, and which is correspondingly toothed to form the other clutch member. The interlocking of the toothed portions of the hubs $4^a$ and $4^b$, respectively, forms a clutch 5, which must necessarily form the hubs and bevel gear when the toothed portions are in clutch.

The hub of each of the bevel gears $3^a$ and $3^b$ is provided with a key-seat 6, $6^a$ which fits the spline 2, $2^a$ on the shaft 1 thus making it necessary for each of the shaft sections to revolve with its respective bevel gear. Each of the hubs, respectively, $4^a$ and $4^b$ of the bevel gears $3^a$ and $3^b$ is provided with a collar, respectively, $7^a$, and $7^b$, and against each of the collars $7^a$ and $7^b$ bears a pair of curved lever arms, respectively, $8^a$ and $8^b$. The lower ends of each pair of levers, respectively, $8^a$ and $8^b$, are pivoted to a block 9, forming part of the frame 10. The upper ends of each pair of curved levers, respectively, $8^a$ and $8^b$, almost meet and are so formed as to present an opening between them to admit the point of the wedge 11.

Vertically above the point mediately between the bevel gears 3 is the center of the vertical counter shaft 13 vertically sliding in the sleeve 15. Extending upwardly from the top of the frame 10 is a sleeve 15 sufficiently larger in diameter than the vertical shaft 13 to permit a spring 16 to be coiled therearound.

On the vertical shaft 13 above the frame 10 is a collar 17 against which and an annular flange 15ᵃ at the bottom of the sleeve 15 presses the coiled spring 16. Loosely mounted on the vertical shaft 13 on the under side of the top piece of the frame 10 is a bevel gear 18.

Extending upwardly from the top of the frame 10 is a lug 19 to which is pivoted one end of a lever 12. The middle part of the lever 12 bears on the upper end of the vertical shaft 13, and the downward pressure of the lever 12 forces down the vertical shaft 13. The downward movement of the vertical shaft 13 brings the bevel gear 18 into engagement with the bevel gear 3, and the downward movement of the vertical shaft 13 also forces the wedge 11 into the opening between the pairs of curved levers 8ᵃ and 8ᵇ, respectively, moving them asunder. This movement of the curved levers moves the bevel gears, respectively, 3ᵃ and 3ᵇ, longitudinally on each of the shaft sections, respectively, 1ᵃ and 1ᵇ, bringing each of the said bevel gears into the proper position to receive the teeth of the bevel gear 18. As shown in Fig. 1 of the drawings both sections 1ᵃ and 1ᵇ of the shaft 1 are rotating in the same direction in the same manner as if the shaft were made in one piece. By bringing the bevel gear 18 into engagement with the bevel gears, respectively, 3ᵃ and 3ᵇ, as shown in Fig. 4, the rotation of the shaft sections can be instantaneously changed, and one shaft section 1ᵇ will be compelled to rotate in the reverse direction to the rotation of the shaft section 1ᵃ. By releasing the pressure on the lever 12 the pressure of the spring 16 forces upward the vertical shaft 13, freeing the bevel gear 18 from engagement with the bevel gears, respectively, 3ᵃ and 3ᵇ, allowing the springs 20ᵃ and 20ᵇ coiled on the shaft sections, respectively, 1ᵃ and 1ᵇ, to move toward each other and the clutch members to mesh.

At a predetermined distance on the shaft section 1ᵃ and to the rear of the bevel gear 3ᵃ is a collar 21ᵃ against which bears the rear end of a spring 20ᵃ while the front end of the said spring presses against the rear side face of the bevel gear 3ᵃ. On the section 1ᵇ of the shaft 1 is a collar 21ᵇ against which bears the rear end of the spring 20ᵇ, while the front end of the spring presses against the rear side face of the bevel gear 3ᵇ.

As the construction of the bearings has nothing whatever to do with the invention I do not deem it necessary here to enter into a description thereof.

Having thus fully described my invention, what I claim as new, and desire to secure by Letters Patent, is—

1. A reversing gear consisting of a shaft composed of sections the adjacent end of each shaft section fitted with a gear adapted to rotate with said section, each gear provided with a hub the adjacent face of each hub having cut thereon a suitable number of teeth to form a toothed clutch member, the sections of said shaft rotating in the same direction during the engagement of said hubs, an intermediate gear adapted to mesh with said gears and disengage the toothed clutch to rotate one section in the reverse direction to the other, substantially as described.

2. In a reversing gear the combination of a shaft composed of sections, a gear mounted on the adjacent end of each section and adapted to revolve therewith, each gear provided with a hub extending to the end of each section of said shaft and fitted thereat with a toothed clutch member said hubs adapted to engage and rotate said sections in the same direction, and intermediate gear adapted to mesh with said gears when necessary to disengage the clutch members of said hubs and rotate one shaft section in the reverse direction to the other, substantially as described.

3. In a reversing gear the combination of a shaft composed of sections, a gear mounted on the adjacent end of each section and adapted to move longitudinally thereon to rotate therewith, each gear fitted with a hub extending to the end of its respective shaft section and fitted thereat with a toothed clutch member, an intermediate gear mounted on a shaft at right angles to the first mentioned gears and adapted to be brought into or out of mesh with said gears, said intermediate gear provided with a wedge to disengage the clutch member of said hubs, substantially as described.

4. In a reversing gear the combination of a shaft composed of sections, the adjacent ends of each of which is fitted with a gear, each gear provided with a hub extending to the end of said sections and fitted thereat with a toothed clutch adapted to mesh with the clutch member the adjacent hub to rotate said sections in the same direction when said clutches are in mesh, an intermediate gear mounted on a shaft arranged at right angles to the first mentioned shaft adapted to be brought into or out of mesh with said gears, pivoted levers arranged to move said gear longitudinally on said shaft, a wedge fitted to said intermediate gear adapted to move said levers, substantially as described.

5. In a reversing gear the combination of the shaft 1 composed of sections 1ᵃ and 1ᵇ, a spline 2 fitted at or near the adjacent end of each section and extending longitudinally along the shaft 1, a bevel gear mounted on the adjacent end of each section the hubs 4 4ᵃ of which meet, the meeting face of each hub provided with a toothed clutch member arranged to form a clutch to cause both hubs to revolve together when they are in mesh, each of said bevel gears and hubs adapted to rotate with its respective section of the shaft, levers 8 and 8ᵇ the lower end of each of which is pivoted in a block 9 forming part of the frame 10 of the bearings of the shaft, the upper ends of each of the curved levers 8ª and 8ᵇ almost meeting and presenting a slight opening between them, a wedge 11 connected to an intermediate gear 18, an intermediate gear 18 mounted on a vertical shaft 13 sliding vertically in the sleeve 15, said intermediate gear adapted to be brought into or out of mesh with said gear as desired substantially as described.

Toronto, June 19, 1893.

CHAS. WARD.

In presence of—
  C. H. RICHES,
  M. E. RICHES.